(12) United States Patent
Hagie

(10) Patent No.: US 7,669,675 B2
(45) Date of Patent: Mar. 2, 2010

(54) AGRICULTURAL SPRAYER

(75) Inventor: Alan B. Hagie, Clarion, IA (US)

(73) Assignee: Hagie Manufacturing Co., Clarion, IA (US)

( * ) Notice: Subject to any disclaimer, the term of this patent is extended or adjusted under 35 U.S.C. 154(b) by 1227 days.

(21) Appl. No.: 11/032,018

(22) Filed: Jan. 6, 2005

(65) Prior Publication Data

US 2006/0144970 A1    Jul. 6, 2006

(51) Int. Cl.
*B60P 3/22* (2006.01)
(52) U.S. Cl. .............................. 180/24; 180/22; 280/830
(58) Field of Classification Search ................ 180/22, 180/24.1, 209, 23, 24; 280/830, 837 E, 838, 280/839
See application file for complete search history.

(56) References Cited

U.S. PATENT DOCUMENTS 1,927,088 A * 9/1933 Gerlinger .................... 280/104
2,544,521 A * 3/1951 Bergen ...................... 280/81.5
3,341,220 A * 9/1967 Kress ......................... 296/35.1
4,121,680 A * 10/1978 van der Lely ................. 180/24
5,597,172 A * 1/1997 Maiwald et al. ........ 280/124.153
6,371,237 B1* 4/2002 Schaffer ..................... 180/253
6,491,306 B2* 12/2002 Schaffer .................. 280/5.502

FOREIGN PATENT DOCUMENTS

GB          2 029 784 A   *  3/1980

* cited by examiner

*Primary Examiner*—Ruth Ilan
(74) *Attorney, Agent, or Firm*—Brett Trout

(57) ABSTRACT

An agricultural sprayer is provided, having a plurality of wheels. By providing six wheels, a narrow overall wheel width may be maintained to allow for use of the sprayer in post-emergent crop spray applications. By providing six wheels, a greater amount of fluid may be provided on the vehicle without increasing soil compaction. By providing low soil compaction and a high fluid capacity, the applicator may be utilized in both pre-emergent and post-emergent situations, and may be utilized on wet or soft ground, where standard applicators may not be utilized.

20 Claims, 3 Drawing Sheets

AGRICULTURAL SPRAYER

BACKGROUND OF THE INVENTION

1. Field of the Invention

The present invention relates in general to an agricultural sprayer and, more particularly, to a high-clearance agricultural sprayer with a high fluid capacity and low ground compaction.

2. Description of the Prior Art

It is well known in the art to provide methods and apparatuses for applying fluid in agricultural applications. Applicators typically include a frame supporting a large fluid container and driven by large wheels. As refueling the container wastes a considerable amount of valuable time, especially if inclement conditions provide a small window of opportunity to apply fluid to an agricultural field, it is desirable to carry as much fluid on the applicator as possible.

Conversely, it is desirable to minimize the impact of the applicator on the soil. Compacted soil is undesirable for many reasons, including the difficulty associated with subsequently working the field and the detrimental impact compaction has on plants and their root systems. Applicators, therefore, are typically provided with very large wheels, having very large footprints to minimize the pressure applied to any single point in the field. Such applicators typically have very wide wheels to distribute the pressure associated with large fluid containers over as wide an area as possible.

It is also desirable to apply fluid, such as herbicides and the like, to crops after the crops have emerged. In an effort to maximize the crop yield, crops are typically planted in rows very close to one another. Such close planting often prohibits pre-emergent applicators from being used, as the extremely wide tires are wider than the crop rows. Use of a pre-emergent applicator on growing crops would cause the crops to be compacted and destroyed under the wheels of the applicator. Accordingly, post-emergent applicators are typically provided with wheels sufficiently narrow to ride between the rows of crops to avoid any damage thereto.

Unfortunately, narrowing the wheels to avoid crop damage increases the pressure the wheels transfer to the footprint. Accordingly, prior art machines have typically had to reduce the fluid capacity and, therefore, the weight of post-emergent applicators to reduce the impact of the compaction the applicator transmits to the soil during application. This reduction in capacity requires more frequent refills, delaying the application process, and resulting in lost income and productivity.

Accordingly, it would be desirable to provide a multi-use applicator which would provide for a very large fluid capacity, while maintaining a minimal compaction of the soil. The difficulties encountered in the prior art discussed hereinabove are substantially eliminated by the present invention.

SUMMARY OF THE INVENTION

In an advantage provided by this invention, an agricultural fluid applicator having an increased fluid capacity is provided.

Advantageously, this invention provides an agricultural fluid applicator with a narrow wheel width for application of fluid to post-emergent crops.

Advantageously, this invention provides a six wheel agricultural fluid applicator with an improved steering system.

Advantageously, this invention provides a six wheel agricultural fluid applicator with an improved suspension system to reduce stress on the frame.

Advantageously, in the preferred example of this invention, an agricultural vehicle is provided with a frame and six wheels. The wheels are mounted to the frame and provided with a diameter at least one and one-half meters, and a width no greater than one meter. The wheels are also preferably provided three on each side of the frame, at least two-hundred fifty centimeters from one another. Preferably, the vehicle is provided with a fluid capacity of at least four thousand liters, and a clearance at least one-hundred centimeters high and two-hundred centimeters wide.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
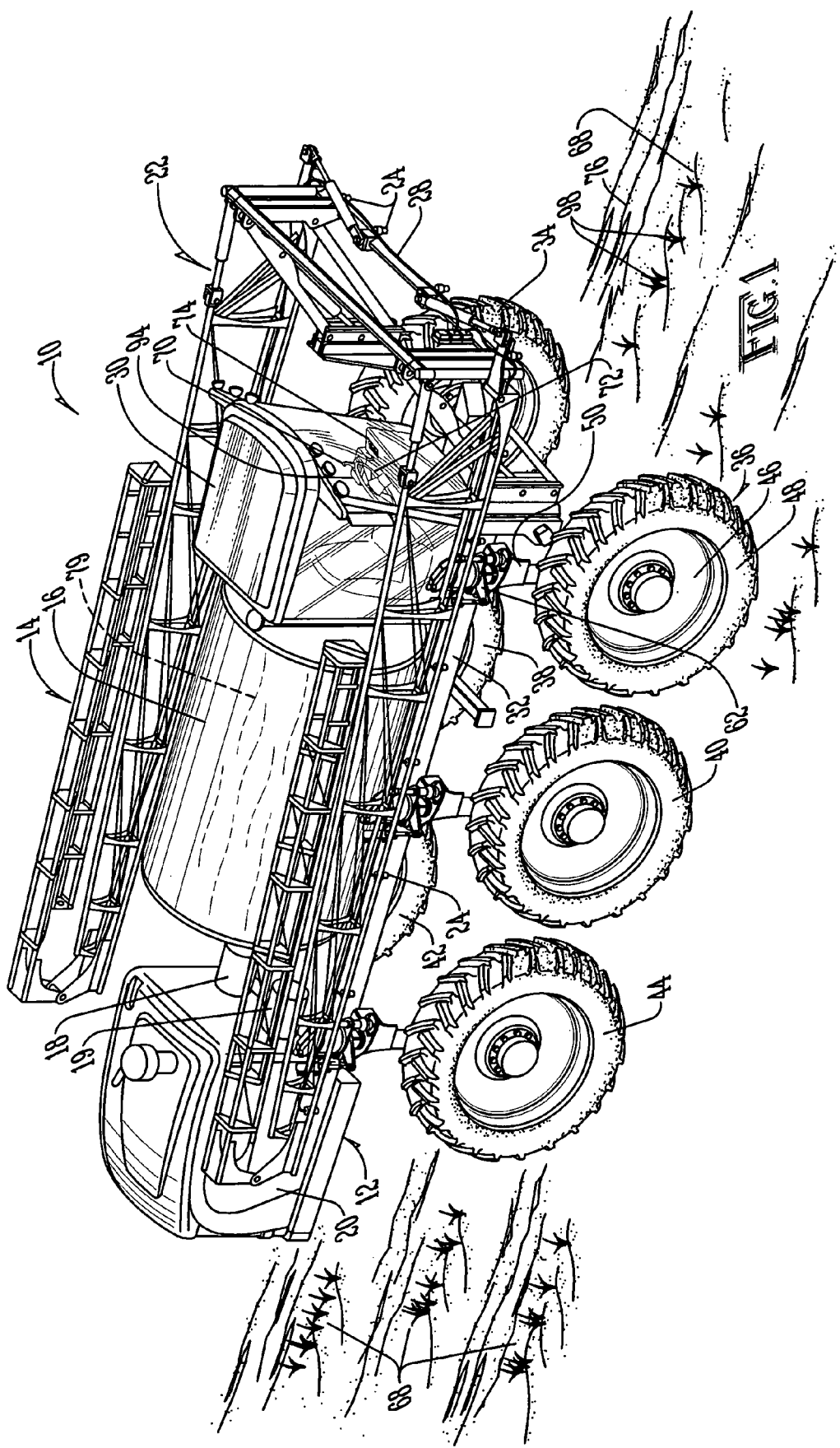
FIG. 1 illustrates a top perspective view of an agricultural sprayer incorporating the present invention.
Figure 2:
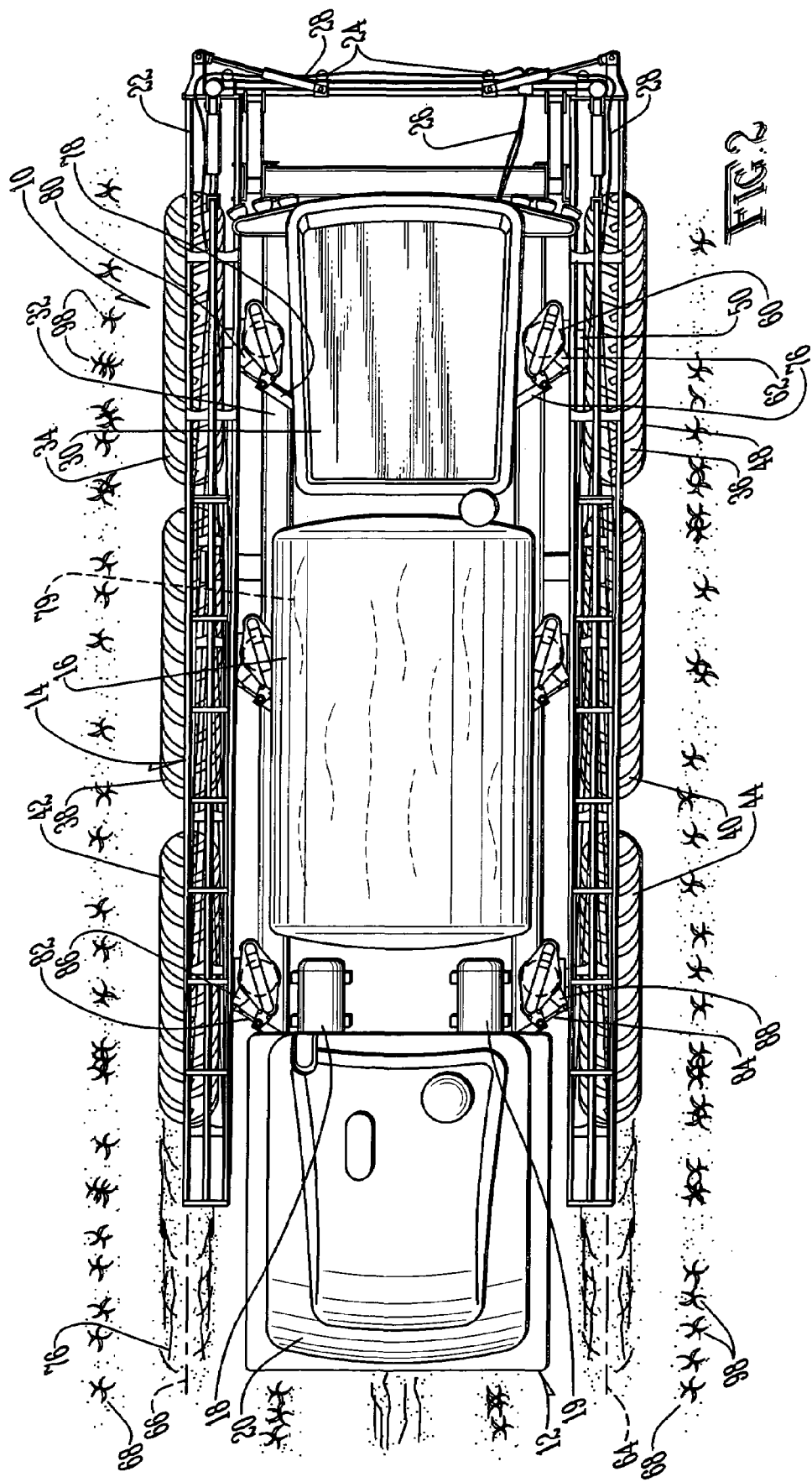
FIG. 2 illustrates a top plan view of the agricultural sprayer of FIG. 1.

An agricultural spray system according to the present invention is shown generally as (10) in FIG. 1. The system includes a vehicle (12) coupled to a spray system (14). The spray system (14) includes a large capacity fluid container (16) which may be of any desired capacity. In the present invention, the capacity is forty-five hundred and forty-two liters, but may be six-thousand fifty-six liters, sixty-eight hundred and four liters, seventy-five hundred and seventy liters, or any desired capacity. The tank is constructed using materials known in the art, such as those used to construct the STS 10 and STS 12 sprayers manufactured by Hagie Manufacturing Company of Clarion, Iowa. The spray system (14) also includes a hydraulic pump (18), powered by a diesel engine (20) in a manner such as that known in the art. (FIG. 2). The spray system (14) also includes a spray boom (22), provided with a plurality of spray nozzles (24). The spray system (14) is also provided with a plurality of hydraulic lines (26), coupled from the hydraulic pump (18) to the spray boom (22). A plurality of fluid lines (28) are also provided between the fluid container (16), spray boom (22) and spray nozzles (24).

The present spray system (10) also includes a driver's cab (30) provided on a frame (32), which also supports the fluid container (16) and diesel engine (20). As shown in FIG. 1, the system (10) is provided with six wheels (34), (36), (38), (40), (42) and (44). As shown in FIG. 1, each wheel (34), (36), (38), (40), (42) and (44) includes a center wheel (46) and tire (48). Since the wheels (34), (36), (38), (40), (42) and (44) are of a like construction and similarly assembled, albeit as mirror-imaged pairs, only the wheel (36) will be described in detail, with like numbers being applied to like parts.

Figure 3:
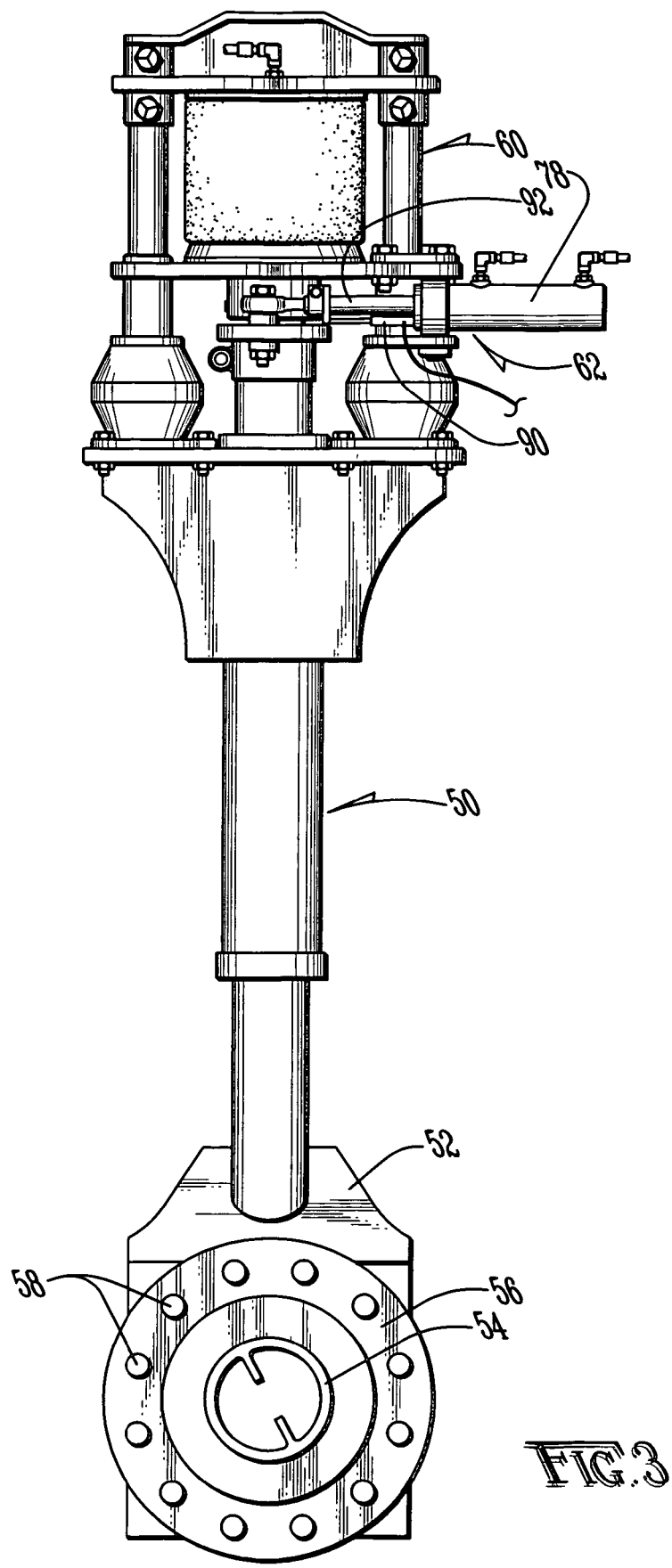
FIG. 3 illustrates a side elevation of the leg boom suspension and steering system of the agricultural sprayer of FIG. 1.

The wheel (36) is coupled to the leg assembly (50) shown in FIG. 3, which is the subject of U.S. Pat. No. 6,371,237, and which is incorporated hereby reference. As shown in FIG. 3, the leg assembly (50) is provided with a hydraulic motor (52) and an output shaft (54). The output shaft (54) is welded or otherwise secured to a transfer disc (56). The transfer disc (56) is coupled to the center wheel (46) by a plurality of lugs (58). As shown in FIG. 3, the top of the leg assembly (50) is provided with a suspension system (60) and steering system (62), similar to that described in U.S. Pat. No. 6,371,237. The width of the wheel (36) and leg assembly (50) is preferably less than forty-nine centimeters. The midlines (64) of the right side wheels (36), (40) and (44) are preferably separated from the midlines (66) of the left side wheels (34), (38) and (42) by a distance of three-hundred five centimeters. The midlines (64) and (66) may alternatively be separated by a distance of three-hundred, ninety-one centimeters, or any desired distance to accommodate the width and separation of crop rows (68). As described in U.S. Pat. No. 6,371,237, all of the leg assemblies (50) may be attached to crossbars to allow the midlines (64) and (66) to be adjusted to any desired width.

By providing the suspension systems (60) to each of the wheels (34), (36), (38), (40), (42) and (44), all of the wheels (34), (36), (38), (40), (42) and (44) track across the ground (76), even in situations where the ground (76) is hilly or undulating. If the suspension systems (60) were not so provided, and if the vehicle (12) were to move across very hilly or undulating terrain, or to encounter a large rock or other obstacle (not shown), one or more wheels (34), (36), (38), (40), (42) and (44) may leave the ground, causing a great amount of torsional stress to the frame (32). Over a period of time, accumulated stress could cause the frame (32) to fail. By allowing the wheels (34), (36), (38), (40), (42) and (44) to raise and lower independently, the stress to the frame (32) is greatly reduced.

As shown in FIG. 1, the steering system (62) is coupled to the hydraulic pump (18) and to a steering flow controller (70) coupled to a steering wheel (72) located within the cab (30). The steering flow controller (70) is also coupled to a central processing unit (94) controlled by a rocker switch (74) located within the cab (30). The rocker switch (74), via the central processing unit (94), actuates the steering flow controller (70) to operate in two different modes: a synchronous mode and an asynchronous mode. In synchronous mode, when the steering wheel (72) is rotated in a clockwise direction, the central processing unit (94) causes the steering flow controller (70) to turn the front wheels (34) and (36) and the rear wheels (42) and (44) to the right. The steering flow controller (70) actuates valves which cause fluid pumped by the hydraulic pump (18) to actuate two hydraulic actuators (76) and (78) associated with the front two steering systems (80) and (62) to rotate the front two wheels (34) and (36) to the right. In synchronous mode, the steering flow controller (70) also actuates valves which cause fluid pumped by the hydraulic pump (18) to actuate two hydraulic actuators (82) and (84) associated with the rear two steering systems (86) and (88) to rotate the rear two wheels (42) and (44) to the right.

In asynchronous mode, when the steering wheel (72) is rotated in a clockwise direction, the central processing unit (94) causes the steering flow controller (70) to turn the front wheels (34) and (36) to the right and the rear wheels (42) and (44) to the left. In asynchronous mode, the steering flow controller (70) still actuates valves which cause fluid pumped by the hydraulic pump (18) to actuate the two hydraulic actuators (76) and (78) associated with the front two steering systems (80) and (62) to rotate the front two wheels (34) and (36) to the right. In asynchronous mode, however, the steering flow controller (70) actuates the valves associated with the two rear hydraulic actuators (82) and (84) in the reverse direction, thereby rotating the rear two wheels (42) and (44) to the left for a tighter turning radius. In both synchronous and asynchronous modes, turning the steering wheel does not actuate the center wheels (38) and (40) in either direction.

As shown in FIGS. 2-3, the front steering systems (62) and (80) and rear two steering systems (86) and (88) are provided with angle sensors (90) coupled between the hydraulic actuators (76), (78), (82) and (84) and the shafts (92) associated therewith. The angle sensors (90) are coupled to the central processing unit (94). When the rocker switch (74) is actuated, the central processing unit (94) utilizes the angle sensors (90) to determine the angle of the rear wheels (42) and (44) relative to the front wheels (34) and (36). Once this angle has been determined, the central processing unit (94) causes the steering flow controller (70) to turn the rear wheels (42) and (44) to the proper angle relative to the front wheels (34) and (36) associated with the selected mode.

If the rocker switch (74) is being actuated into synchronous mode, the central processing unit (94) causes the steering flow controller (70) to turn the rear wheels (42) and (44) to the same angle as the front wheels (34) and (36). If the rocker switch (74) is being actuated into asynchronous mode, the central processing unit (94) causes the steering flow controller (70) to turn the rear wheels (42) and (44) to in the opposite direction as the front wheels (34) and (36).

If desired, steering of the center wheels (38) and (40) may be provided in a similar manner. Also, the central processing unit (94) may be programmed in response to rotation of the steering wheel (72), to rotate the rear wheels (42) and (44) the same amount as the front wheels (34) and (36), or more or less, depending upon the turning performance desired.

As shown in FIG. 2, the container (16) is located centrally between the front wheels (34) and (36), and rear wheels (42) and (44), to more evenly distribute the weight of the fluid (96) provided within the container (16). The preferred embodiment of the vehicle (12) defines a clearance at least one meter high and at least two meters wide, but may, of course, define any desired clearance to accommodate post-emergent crops (98). The vehicle (12) is preferably designed to have a spray boom (22) which collapses so that the overall dimension of the system (10) is no greater than three-hundred, ninety-seven centimeters high, and three-hundred, sixty-six centimeters wide, to allow the system (10) to be transported across public roadways. While more than six wheels may be provided, at least six wheels are preferable to distribute the weight of the fluid (79) across a wider area to allow the system to apply fluid (79) to crops (98) on softer soil, and/or wetter ground, and to reduce the detrimental impact of soil compaction on the crops (98). Preferably, the outer diameter of the wheels ranges from one hundred and eighty three centimeters to two hundred and five centimeters.

The foregoing description and drawings merely explain and illustrate the invention. The invention is not limited thereto, except insofar as the claims are so limited, as those skilled in the art who have the disclosure before them will be able to make modifications and variations therein, without departing from the scope of the invention. For example, it is anticipated that the system (10) may be provided with eight or more wheels, as desired.

What is claimed is:

1. An agricultural vehicle comprising:
  (a) a frame;
  (b) a first wheel mounted to said frame, having a diameter at least as great as one and one-half meters, and a width no greater than one meter;
  (c) a second wheel mounted to said frame and having a diameter at least as great as one and one-half meters, and a width no greater than one meter, and wherein said midline of said second wheel is mounted to said frame substantially parallel to said frame at least 250 centimeters from a midline of said first wheel;
  (d) a third wheel mounted to said frame, having a diameter at least as great as one and one-half meters, and a width no greater than one meter;
  (e) a fourth wheel mounted to said frame and having a diameter at least as great as one and one-half meters, and a width no greater than one meter, and wherein said midline of said fourth wheel is mounted to said frame substantially parallel to said frame at least 250 centimeters from a midline of said third wheel;

(f) a fifth wheel mounted to said frame, having a diameter at least as great as one and one-half meters, and a width no greater than one meter; and (g) a sixth wheel mounted to said frame and having a diameter at least as great as one and one-half meters, and a width no greater than one meter, wherein said midline of said sixth wheel is mounted to said frame substantially parallel to said frame at least 250 centimeters from a midline of said fifth wheel;

(h) wherein said third wheel and said fourth wheel are located between a first vertical plane and a second vertical plane, wherein said first vertical plane is defined by a center of said first wheel and a center of said second wheel, and said second vertical plane is defined by a center of said fifth wheel and a center of said sixth wheel; and (i) a fluid tank having a capacity of at least four hundred liters, wherein said fluid tank is located across a vertical plane defined by a center of said third wheel and a center of said fourth wheel.

2. The agricultural vehicle of claim 1, wherein said midline of said second wheel is no greater than 450 centimeters from said midline of said first wheel, and wherein said midline of said fourth wheel is no greater than 450 centimeters from said midline of said third wheel, and wherein said midline of said sixth wheel is no greater than 450 centimeters from said midline of said fifth wheel.

3. The agricultural vehicle of claim 2, wherein said midline of said second wheel is at least 300 centimeters from said midline of said first wheel; and wherein said midline of said fourth wheel is at least 300 centimeters from said midline of said third wheel; and wherein said midline of said sixth wheel is at least 300 centimeters from said midline of said fifth wheel.

4. The agricultural vehicle of claim 3, further comprising a first spray boom coupled to said fluid tank and cantilevered at least two meters from a first side of said frame.

5. The agricultural vehicle of claim 4, further comprising a second spray boom cantilevered at least two meters from a second side of said frame.

6. The agricultural vehicle of claim 5, wherein said first wheel has a width no greater than seventy-five centimeters, wherein said second wheel has a width no greater than seventy-five centimeters, wherein said third wheel has a width no greater than seventy-five centimeters, wherein said fourth wheel has a width no greater than seventy-five centimeters, wherein said fifth wheel has a width no greater than seventy-five centimeters, and wherein said sixth wheel has a width no greater than seventy-five centimeters.

7. The agricultural vehicle of claim 1, wherein said first wheel has a width no greater than fifty-five centimeters, wherein said second wheel has a width no greater than fifty-five centimeters, wherein said third wheel has a width no greater than fifty-five centimeters, wherein said fourth wheel has a width no greater than fifty-five centimeters, wherein said fifth wheel has a width no greater than fifty-five centimeters, and wherein said sixth wheel has a width no greater than fifty-five centimeters.

8. The agricultural vehicle of claim 1, wherein said vehicle defines a clearance at least one-hundred centimeters high and two-hundred centimeters wide.

9. A fluid delivery vehicle comprising:
(a) a frame;
(b) a fluid container coupled to said frame;
(c) a steerable first wheel coupled to said frame, wherein said wheel is at least one-hundred centimeters in diameter;
(d) a steerable second wheel coupled to said frame, wherein said wheel is at least one-hundred centimeters in diameter;
(e) a steerable third wheel coupled to said frame, wherein said wheel is at least one-hundred centimeters in diameter;
(f) a steerable fourth wheel coupled to said frame, wherein said wheel is at least one-hundred centimeters in diameter;
(g) a steerable fifth wheel coupled to said frame, wherein said wheel is at least one-hundred centimeters in diameter;
(h) a steerable sixth wheel coupled to said frame, wherein said wheel is at least one-hundred centimeters in diameter;
(i) wherein said first wheel is coupled to said frame in substantial coaxial alignment with said second wheel at least two-hundred centimeters from said second wheel;
(j) wherein said third wheel is coupled to said frame in substantial coaxial alignment with said fourth wheel at least two-hundred centimeters from said fourth wheel;
(k) wherein said fifth wheel is coupled to said frame in substantial coaxial alignment with said sixth wheel at least two-hundred centimeters from said sixth wheel
(l) a first spray boom cantilevered at least two meters from a first side of said frame; and
(m) a second spray boom cantilevered at least two meters from a second side of said frame.

10. The fluid delivery vehicle of claim 9:
(a) wherein said first wheel is coupled to said frame in substantial coaxial alignment with said second wheel at least two-hundred fifty centimeters from said second wheel;
(b) wherein said third wheel is coupled to said frame in substantial coaxial alignment with said fourth wheel at least two-hundred fifty centimeters from said fourth wheel; and
(c) wherein said fifth wheel is coupled to said frame in substantial coaxial alignment with said sixth wheel at least two-hundred fifty centimeters from said sixth wheel.

11. The fluid delivery vehicle of claim 9:
(a) wherein said first wheel is coupled to said frame in substantial coaxial alignment with said second wheel no more than four and one-half meters from said second wheel;
(b) wherein said third wheel is coupled to said frame in substantial coaxial alignment with said fourth wheel no more than four and one-half meters from said fourth wheel; and
(c) wherein said fifth wheel is coupled to said frame in substantial coaxial alignment with said sixth wheel no more than four and one-half meters from said sixth wheel.

12. The fluid delivery vehicle of claim 9:
(a) a first wheel coupled to said frame, wherein said wheel is at least one-hundred fifty centimeters in diameter;
(b) a second wheel coupled to said frame, wherein said wheel is at least one-hundred fifty centimeters in diameter;
(c) a third wheel coupled to said frame, wherein said wheel is at least one-hundred fifty centimeters in diameter;

(d) a fourth wheel coupled to said frame, wherein said wheel is at least one-hundred fifty centimeters in diameter;

(e) a fifth wheel coupled to said frame, wherein said wheel is at least one-hundred fifty centimeters in diameter; and (f) a sixth wheel coupled to said frame, wherein said wheel is at least one-hundred fifty centimeters in diameter.

13. The fluid delivery vehicle of claim 9, wherein said first wheel, said second wheel, said third wheel, said fourth wheel, said fifth wheel and said sixth wheel are hydrostatically driven.

14. The fluid delivery vehicle of claim 9:

(a) wherein said first wheel and said second wheel are coupled to said frame in a manner which defines an unobstructed path substantially perpendicular to a line coaxial with said first wheel and said second wheel;

(b) wherein said third wheel and said fourth wheel are coupled to said frame in a manner which defines an unobstructed path substantially perpendicular to a line coaxial with said third wheel and said fourth wheel; and (c) wherein said fifth wheel and said sixth wheel are coupled to said frame in a manner which defines an unobstructed path substantially perpendicular to a line coaxial with said fifth wheel and said sixth wheel.

15. The fluid delivery vehicle of claim 14, wherein said first wheel, said second wheel, said third wheel, said fourth wheel, said fifth wheel and said sixth wheel are hydrostatically driven.

16. The fluid delivery vehicle of claim 9, further comprising:

(a) means coupled to said first wheel for steering said first wheel;

(b) means coupled to said second wheel for steering said second wheel;

(c) means coupled to said fifth wheel for steering said fifth wheel; and (d) means coupled to said sixth wheel for steering said sixth wheel.

17. The fluid delivery vehicle of claim 9, wherein said fluid container has a capacity greater than four thousand liters.

18. An agricultural fluid delivery vehicle comprising:

(a) a frame;

(b) a fluid container coupled to said frame;

(c) a first wheel coupled to said frame;

(d) a second wheel coupled to said frame;

(e) a third wheel coupled to said frame;

(f) a fourth wheel coupled to said frame;

(g) a fifth wheel coupled to said frame;

(h) a sixth wheel coupled to said frame;

(i) wherein said vehicle defines a clearance at least one-hundred centimeters high and two-hundred centimeters wide;

(j) a driver's seat coupled to said frame;

(k) an engine coupled to said frame; and (l) a fluid tank having a capacity of at least four hundred liters coupled to said frame between said driver's seat and said engine.

19. The agricultural fluid delivery vehicle of claim 18, wherein said clearance extends more than midway above said first wheel, said second wheel, said third wheel, said fourth wheel, said fifth wheel and said sixth wheel.

20. The agricultural fluid delivery vehicle of claim 18, wherein said vehicle is less than four-hundred fifty centimeters tall and less than four-hundred centimeters wide.

* * * * *